Figure 1:
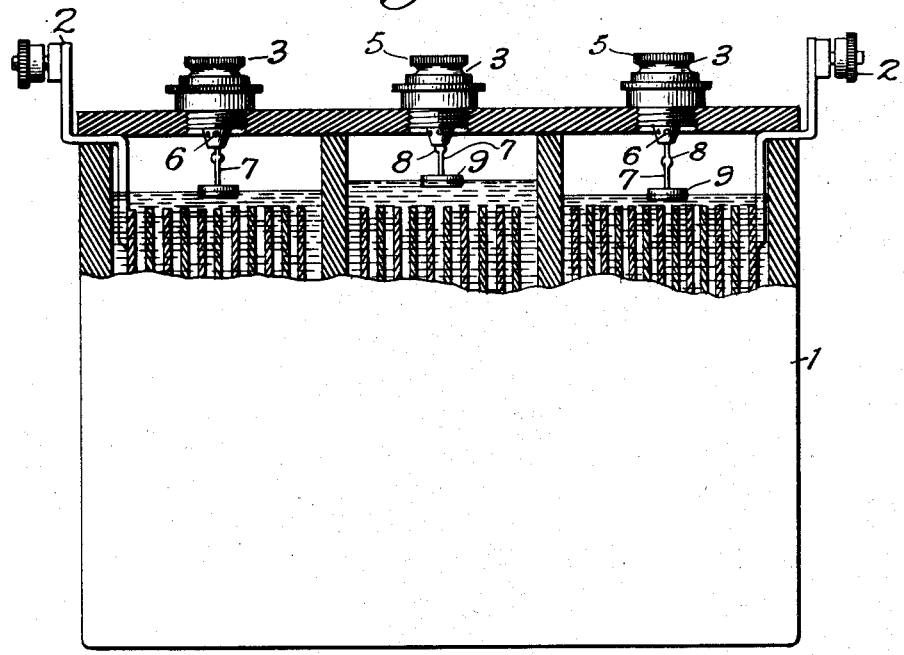

April 22, 1924.

F. L. KERR

BATTERY LIQUID LEVEL INDICATOR

Filed Oct. 17, 1922

1,491,143

INVENTOR.
Frank L. Kerr
BY Julian C. Dowell.
his ATTORNEY.

Patented Apr. 22, 1924.

1,491,143

UNITED STATES PATENT OFFICE.

FRANK L. KERR, OF WILLIAMSPORT, PENNSYLVANIA, ASSIGNOR OF ONE-HALF TO WILLIAM THEIS, JR., OF SOUTH WILLIAMSPORT, PENNSYLVANIA.

BATTERY LIQUID-LEVEL INDICATOR.

Application filed October 17, 1922. Serial No. 595,202.

*To all whom it may concern:*

Be it known that I, FRANK L. KERR, a citizen of the United States, residing at Williamsport, in the county of Lycoming and State of Pennsylvania, have invented certain new and useful Improvements in Battery Liquid-Level Indicators; and I do hereby declare the following to be a full, clear, and exact description of the invention, such as will enable others skilled in the art to which it appertains to make and use the same.

This invention relates to secondary or storage batteries and more particularly to a liquid level indicator for such batteries, for use especially in connection with automobile batteries which are generally inaccessibly bolted within a protective casing or box situated beneath the front seat or floor-board of an automobile where it is inconveniently necessary to unscrew and remove the several filler caps and peer into each cell to discover whether the battery should be refilled. As a rule, artificial light is required to properly illuminate the interior of the battery sufficiently to see the liquid, and incautious or ignorant motorists are occasionally injured or disfigured by acid burns resulting from explosions caused by hold an open flame or lighted match too close to the battery where the liberated gases frequently ignite and flare up into the motorists' faces.

The object of my invention is to provide a novel, simple and inexpensive device, adaptable to all manufactured types of batteries, or to liquid batteries of any description, which will entirely obviate the necessity for removing the filler caps or covers in order to determine the level of the liquid in the battery, thus supplying to the market and especially to automobile owners, an extremely useful time and labor saving device which may also be correctly termed a "safety" appliance.

A further object is to provide a device of the character referred to, which will normally be readily visible, thus obviating the necessity of striking a match or providing other illuminating means in order to see the indicator, unless the battery is obscured in darkness.

The invention will first be hereinafter more particularly described with reference to the accompanying drawings, which are to be taken as a part of this specification and then pointed out in the claims at the end of the description.

Figure 2:
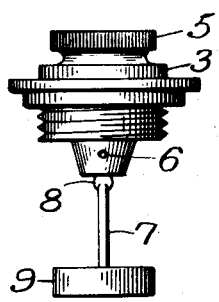
Figure 3:
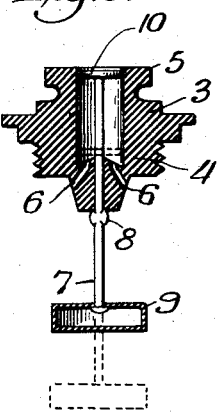

In said drawings, Fig. 1 is a side elevation partly broken away of a battery equipped with my improved liquid level indicator;

Fig. 2 is a side elevation of a battery filler cap within which the indicator is inserted; and Fig. 3 is a vertical sectional elevation of the same.

Referring to the drawings, in which like reference numerals are used to denote corresponding parts throughout the several views, 1 denotes an ordinary secondary or storage battery divided into a series of cells, having the usual positive and negative terminal posts or poles 2 and a series of filler caps 3, each being screwed into a threaded opening through the sealed top of the battery or otherwise detachably secured thereto over one of the cells.

In the form shown, the filler caps 3 of ordinary construction are each formed with central cavities or recesses 4 and provided with milled or knurled heads 5 to facilitate removal. Small vent holes 6 extending through the walls of the frusto-conical base of the cap and opening into the recesses 4 therein are provided as relief vents therethrough, allowing the gases continuously generating in the battery to pass off into the atmosphere.

The caps 3 are further centrally counterbored to smaller diameter, adapting a hard rubber or other non-corrosive plunger stem 7 of the liquid level indicator to be inserted therethrough, said plunger being longitudinally movable up and down within the recesses 4 and formed or provided with a flattened portion or stop 8 intermediate its ends to limit the upward movement thereof beyond a predetermined point. To the lower extremity of the plunger 7, a hardened rubber or other non-corrosive hollow float 9 is rigidly secured, said float being sufficiently buoyant to floatingly support the plunger 7, to the opposite end of which is secured a small non-corrosive button or head 10, the latter being preferably white in color to render it more readily visible.

The plunger 7, the float 9 and the head 10 are preferably composed of hardened rubber, which will not be eaten away nor corrode by the action of the acid in the battery, but glass or some other suitable acid resisting material or composition may be used if preferred.

As the liquid level in the battery decreases, the float 9 will gradually fall, drawing the stem 7 with its indicator button 10 downward until the button 10 finally becomes seated at the bottom of the cavity or recess 4 within the filler cap. The motorist is enabled at all times to determine the exact liquid level in each cell of the battery, merely by glancing at the buttons 10, which will appear flush with the tops of the caps 3 when the battery is filled, and somewhat below the tops of the caps when the battery needs to be refilled. When the buttons 10 appear extremely low within the cavities or recesses 4, the motorist will know that the battery has reached an injurious stage requiring immediate re-filling to prevent the concentrated acid from completely destroying the battery plates.

Since the liquid level indicator attachment is self-contained within the filler cap, it is removed with the latter when unscrewed or detached from place. The battery need not therefore be altered in any respect in order to attach the indicator.

For the purpose of assembling the parts, the button or head 10 may be removable to permit the insertion of the stem 7 within the filler cap, or a detachable connection may be provided below the filler cap for inserting the stem from above, in which case the head 10 may be rigid with the stem.

From the foregoing it will be readily understood that I have provided an extremely useful, inexpensive and novel device for indicating the liquid level of secondary and storage batteries, which entirely obviates the former necessity of periodically removing the various battery filler caps in order to determine the liquid content of the individual cells, which in addition may be correctly termed a "safety device", the danger arising from holding a lighted match or open flame close to the battery being largely reduced, rendering explosions unlikely, inasmuch as the filler caps unless needlessly removed will confine the openings to the battery and prevent the sudden release of abnormal volumes of inflammable gas.

Although the button or head 10 has been illustrated and described as flush with the top of the filler cap 3 when the plunger 7 has reached the upward limit of its movement, it will be understood that if preferred the device may be constructed so that the head 10 will project above the cap 3 when the plunger 7 has reached the limit of its upward movement. Also, distinctive coloring or a coating of some radiolite substance may be applied to the head 10 or the cap 3 to render either or both readily visible in total darkness.

Having thus described my invention, what I claim as new and desire to secure by Letters Patent of the United States is:

1. In combination with a battery, a removable recessed filler cap having a plunger longitudinally movable therethrough, a float rigidly secured to the confined end of the plunger adapted to buoyantly rest upon the surface of the liquid in the battery, and a visible head piece carried on the exposed end of said plunger and movable within a recessed cap, whereby the level of the liquid may be ascertained by the relative position of said head within the recess in said filler cap.

2. In combination with a storage battery, a liquid level indicator comprising a removable recessed cap secured to the battery through an opening in the top thereof, having a reciprocal plunger limited in longitudinal movement therethrough, a buoyant member rigidly secured to the confined end of the plunger adapted to float upon the surface of the liquid in the battery, and a visible head carried on the exposed end of said plunger and movable within the cap whereby the level of the liquid in the battery will be indicated by the relative position of said head within the recess in said cap.

3. In combination with a storage battery, a liquid level indicator comprising a removable recessed filler cap attachable thereto through an opening in the top of the battery having gas escape vents and an acid resisting plunger longitudinally movable therethrough, an acid resisting buoyant element rigidly secured to the confined end of the plunger adapted to float upon the surface of the liquid in the battery, and a visible head piece carried on the exposed end of said plunger normally flush with the top of the filler cap and movable therewithin whereby the level of the liquid in the battery may be determined by the relative position of said head within the recess in said filler cap.

4. A liquid level indicator for batteries comprising a recessed filler cap attachable to the battery through an opening in the top thereof and having an acid resisting plunger of non-corrosive material longitudinally movable therethrough, a non-corrosive float rigidly secured to the inner end of the plunger adapted to buoyantly rise or fall with the liquid in the battery, and a visible head piece carried on the other end of said plunger and movable within the recessed cap whereby the rise or fall of the liquid in the battery may be ascertained by the relative height of said head within the recess in said cap.

5. In combination with a battery, a removable recessed filler cap having a reciprocal plunger longitudinally movable in an opening therethrough, a non-corrosive float rigidly secured to the confined end of the plunger adapted to buoyantly rest upon the surface of the liquid in the battery, and a visible head piece carried on the exposed end of said plunger and limited to movement within the cap, whereby the level of the liquid may be ascertained by the relative position of said head within the recess in said filler cap.

6. In combination with a storage battery, a liquid level indicator comprising a recessed filler cap removably secured in an opening in the top of the battery having a plunger of non-corrosive material longitudinally movable therethrough, a non-corrosive buoyant element rigidly secured to the confined end of the plunger adapted to float upon the surface of the liquid in the battery and to rise and fall therewith, and a non-corrosive visible head piece carried on the exposed end of said plunger normally flush with the top of the filler cap when the liquid within the battery is at proper level, variations in the level of the liquid within the battery being externally determinable by the relative position of said head within the recess in said filler cap.

7. In combination with a storage battery, a liquid level indicator comprising a removable recessed filler cap attachable thereto through an opening in the top of the battery having gas escape vents communicating between the recess in the cap and the interior of the battery and an acid resisting reciprocal plunger limited in longitudinal movement therethrough, an acid resisting buoyant element rigidly secured to the confined end of the plunger adapted to float upon the surface of the liquid in the battery, and a visible head piece carried on the exposed end of said plunger and movable within the recessed cap whereby the level of the liquid in the battery may be determined by the relative position of said head within the recess in said filler cap.

In testimony whereof I affix my signature in the presence of two witnesses.

FRANK L. KERR.

Witnesses:
CHARLES F. GREEVY,
CHRISTIAN MONDLED.